April 7, 1970 J. W. HOWLETT 3,504,938
CONCRETE PRESTRESSING APPARATUS(SPLIT NUT)
Original Filed Aug. 16, 1963 2 Sheets-Sheet 1
Fig. 1
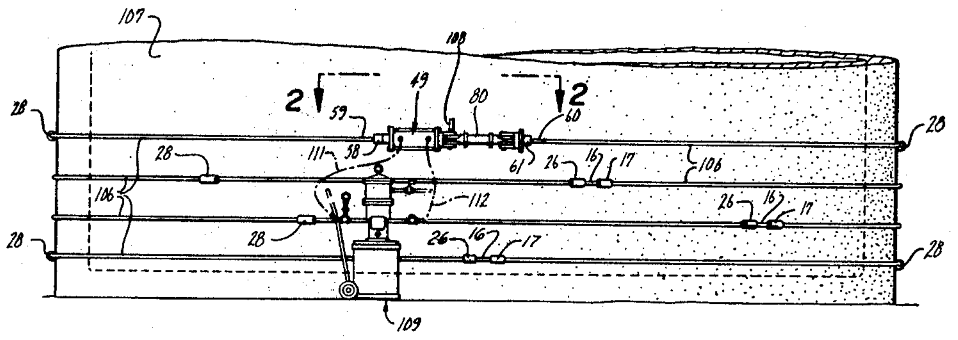
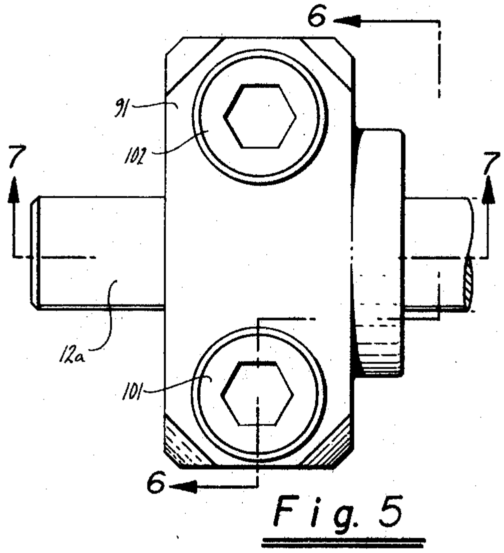
Fig. 5
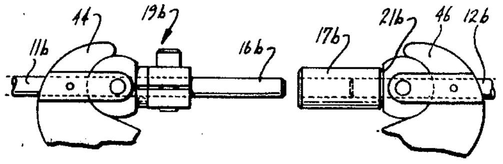
Fig. 4
Fig. 7
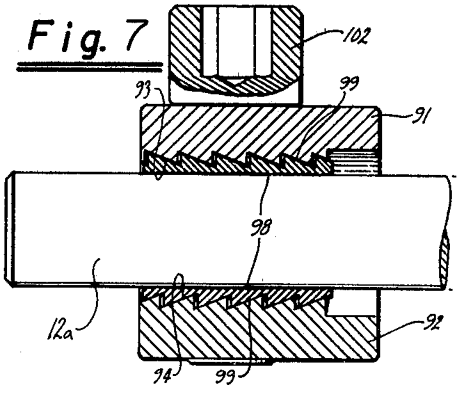
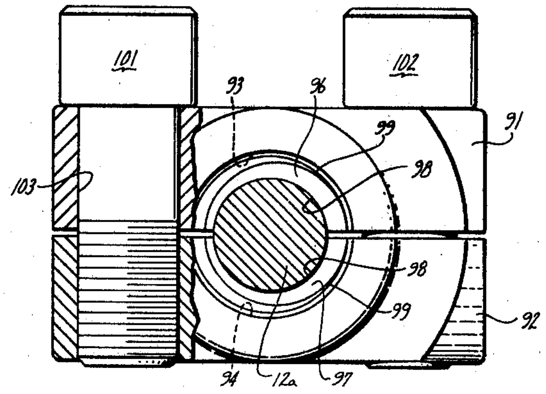
Fig. 6
INVENTOR.
James W. Howlett
BY Manfred M. Warren
His Attorney

CONCRETE PRESTRESSING APPARATUS (SPLIT NUT)

Original Filed Aug. 16, 1963 2 Sheets-Sheet 2

INVENTOR.
James W. Howlett
BY Manfred M. Warren
His Attorney

United States Patent Office 3,504,938
Patented Apr. 7, 1970

3,504,938
CONCRETE PRESTRESSING APPARATUS
(SPLIT NUT)
James W. Howlett, Richmond Annex, Calif., assignor to Howlett Machine Works, a corporation of California
Original application Aug. 16, 1963, Ser. No. 302,628, now Patent No. 3,343,808, dated Sept. 26, 1967. Divided and this application Sept. 20, 1967, Ser. No. 669,120
Int. Cl. F16b 7/00; F16d 1/00; F16l 21/00
U.S. Cl. 287—114                                      1 Claim

ABSTRACT OF THE DISCLOSURE

Described herein is a unique one-way removable bar or rod gripping nut particularly adapted for use in tensioning concrete, prestressing or reinforcing tendons wherein the gripping nut generally comprises a split housing, a split wedging sleeve and means for securing the housing with this sleeve therein about a rod or bar. The wedging feature of the invention provides an increasing gripping force applied to the rod when pulled in one direction with respect to the nut.

---

The present application is a division of present U.S. application S.N. 302,628, filed Aug. 16, 1963 for Concrete Prestressing Apparatus, and now Patent No. 3,343,-808.

The invention relates generally to the art of prestressing various concrete structural members by the use of tensioning tendons such as wires, rods, stranded cables or bars, and more particularly to a novel one-way rod gripping nut which is characterized by its outstanding gripping or securing action together with ease in detachment. Both of these features are particularly advantageous in connection with the concrete prestressing art.

In various concrete prestressing operations, it is required that tension be applied to elongated tensioning tendons. This may involve either pretensioning or post-tensioning of such tendons in relation to the concrete to be prestressed. Some tensioning techniques involve securing a rod at one of its ends to a stationary object, and then pulling the rod from its other end and securing it with the rod under tension. In reinforcing large cylindrical tanks or the like, it has been common to wind wire or rods around the outer sidewall of the tank as a form of post-tensioning, which creates the desired radially inward prestressing forces. A disadvantage of the wire winding technique is that the wires are relatively small and therefore are subject to corrosion and breakage whereby maintenance becomes a significant problem. The use of steel rods in prestressing tanks has generally involved two end opposed axially aligned rods secured at their remote ends, with means being provided for drawing togeher the adjacent ends of the rods to place them under tension. Heretofore this has been accomplished by the use of turnbuckles or similar devices involving threaded couplings. Aside from the tedious task of tightening a turnbuckle, this type of tensioning device is not capable of achieving the same high order of prestressing that can be withstood by modern special alloy steel rods. For example, rods are available that have a tension strength in excess of 100,000 pounds per square inch, and which can withstand tension forces much greater than that provided in practice by turnbuckle devices. Moreover, it has been found impractical to use coupling devices wherein threads are formed in the tensioning rods, inasmuch as the threads create weakened shear planes incapable of withstanding high tensile forces of the magnitude above mentioned. Another technique has been to provide heads or enlargements on the confronting ends of the tendons. These heads are then engaged by plates which may be drawn together by a hydraulic jack, after which bolts are mounted through the plates in connecting fashion and nuts run down on the bolts to hold the plates against separation upon subsequent release of the hydraulic jack. The plates and bolts thus form a holding frame or bracket for the tendons. While effective as a means for holding tendons under stress, the foregoing arrangement is relatively large and bulky, and considerably time consuming. Also where center stressing of tendons is used in prestressed floor slabs, the foregoing arrangement may be too large and bulky for convenient use.

Briefly, the present invention which is described in cooperation with means for and securing a pair of opposed tendon ends, as more fully set forth in my co-pending U.S. patent application S.N. 302,628, filed on Aug. 13, 1963, comprises a removable unidirectional wedging grip nut. The invention is especially adapted for aiding the above mentioned tendon drawing and securing operations in the concrete prestressing art.

Accordingly, it is a main object of the present invention to provide an improved apparatus for tensioning rods by drawing together and connecting them, and whereby the rods can be placed under large tensile forces approaching their maximum tensile strength.

Another object is to provide an apparatus of the character described for quickly, simply and efficiently connecting two spaced and opposed rods and placing them under high tensile stress.

A further object is to provide an apparatus of the character described capable of prestressing circular tanks of the like by applying tension to rods disposed circumferentially around the tank's outer wall.

It is a particular object of this invention to provide a novel and improved wedge grip removable nut for mounting on the end of a tendon and for axially receiving a bar or rod in one-way gripping relation and holding it against return movement.

Still a further object is to provide a wedge grip nut that can be removably mounted on a bar portion to provide means for applying axial force to the bar, such as by means of a bifurcated jaw jack as described in the above mentioned application S.N. 302,628.

The invention possesses other objects and features of advantage, some of which of the foregoing will be set forth in the following description of the preferred form of the invention which is illustrated in the drawings accompanying and forming part of this Specification. It is to be understood, however, that variations in the showing made by the said drawings and description may be adopted within the scope of the invention as set forth in the claims.

Referring to said drawings (three sheets):

FIGURE 1 is a side elevation of a concrete tank depicting the apparatus of the present invention for post-tensioning encircling rods employed to prestress the tank.

FIGURE 4 is a fragmentary plan view similar to FIGURES 2 and 3, depicting another alternative embodiment of the invention.

FIGURE 5 is a side view of the wedge grip nut of the present invention in the embodiment of FIGURES 3 and 4.

FIGURE 6 is a cross-sectional transverse view taken along the planes suggested by the line 11—11 in FIGURE 5.

FIGURE 7 is a cross-sectional view taken along the axis of the bar member shown in FIGURE 5, and is suggested by the line 12—12 as shown in FIGURE 5.

Figure 3:
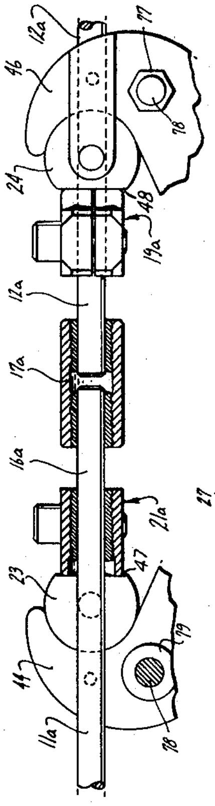
FIGURE 3 is a fragmentary plan view partially cut away and in cross-section, similar to FIGURE 2, but depicting tensioning apparatus forming an alternative embodiment of the invention.

Referring now to the drawings, and by way of introduction to the present invention, means are described for drawing together and tensioning two generally aligned tendons 11 and 12 having opposed spaced ends 13 and 14, a bar member 16; at least one coupler member 17 having gripping means 18 for axially receiving the bar member 16 and holding it against return movement; one of the members 16 and 17 being mounted on the tendon 11 in opposed confronting relation to the tendon 12; means for mounting the other of said members 16 and 17 on the tendon 11 in position for operative engagement with the member on the tendon 12; jack engaging means 19 and 21 are provided respectively on each said tendon 11 and 12; and jacking means including jaws 23 and 24 for engaging the jack engaging means 19 and 21 for forcing the tendons 11 and 12 towards one another and operatively connecting the members 16 and 17 together, whereby the jacking means can be released to leave the tendons and members under tension.

Figure 2:
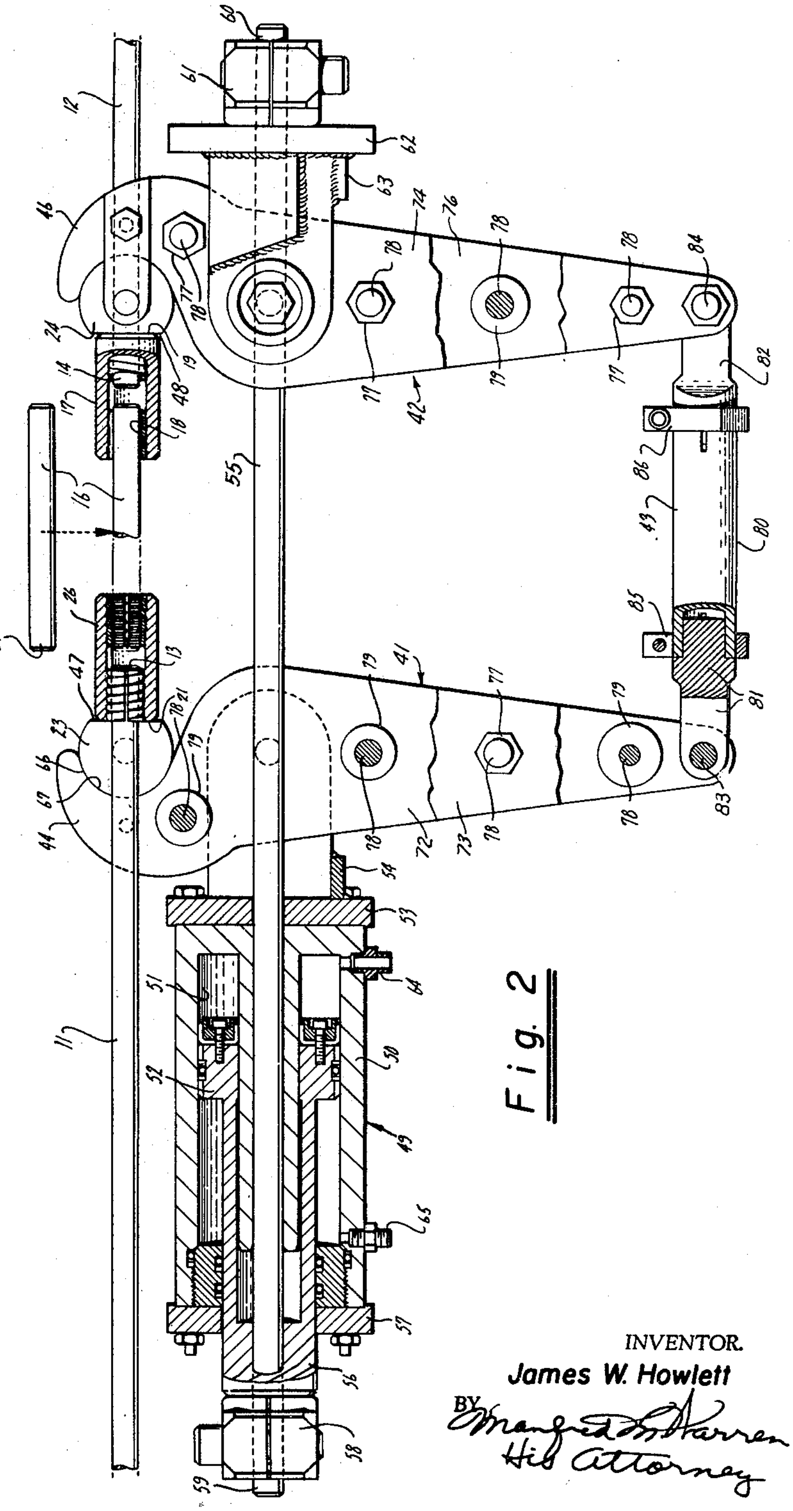
FIGURE 2 is a plan view, in an enlarged scale and partially cut away and in cross-section, of tensioning apparatus embodying the present invention.

In the embodiment of the invention depicted in FIGURE 2, specifically wedge gripping nuts 58 and 61. The means for mounting the bar 16 on the tendon 11 includes a second coupler 26 mounted on the tendon 11 and adapted to receive the end 27 of the bar member 16 in the same manner as does the coupler 17. The remote end shoulders of the couplers 17 and 26 are seen in this embodiment to provide the aforesaid jack engaging means 19 and 21, and the jaws 23 and 24 engage these shoulders to draw the tendons together.

Regarding the structure of couplers 17 and 26 reference may be made to the aforesaid U. S. patent application S.N. 302,628 wherein the particular features of these elements are described in detail. For the present however, it will be sufficient to note that couplers 17 and 26 provide at their respective opposing ends complementary one-way gripping mechanisms for axially securing a pair of bars such as tendon 11 and bar member 16 under tension.

Still further, to provide background for full understanding of the invention the method associated therewith in broad terms consists in the steps of mounting the coupler member 17 on the tendon 12 and providing the bar member 16 on the end of the tendon 11, which as depicted in FIGURE 2 involves the provision of a coupler 26 secured to the tendon 11 and adapted to grippingly receive the end 27 of the bar 16. Force is applied by the jacking means to urge the tendons together and to bring the couplers 17 and 26 into gripping connecting engagement with the bar 16. Also as depicted in FIGURE 2, the bar 16 is initially placed between the couplers 17 and 26 in spaced relation therewith, after which the couplers are drawn together into engagement with the respective ends of the bar. The force of the jacking means is then slowly released thereby enabling the bar to be gripped securely by the couplers.

The wedge grip nut of the instant invention is shown in cooperation with the apparatus and method of S.N. 302,628, nuts 19*a*, 21*a* 19*b*, 58 and 60. One of these nuts, identified as 19*a*, is illustrated in detail in FIGURES 5, 6 and 7. The nut is particularly constructed for mounting either permanently or temporarily upon a bar or rod and for this purpose is split longitudinally for removal from the rod in two half sections. Accordingly, the nut housing is formed of a pair of half-cylindrical housing sections 91 and 92, and these fit around a pair of half-cylindrical wedge sections 96 and 97, the latter cooperating to surround rod 12*a* in the same manner as wedge member 34. The wedge sections 96 and 97 have internal bar engaging surfaces 98 formed with teeth for biting into and compressively engaging and gripping the periphery of the bar. Also similar to the coupling construction above described, the wedge and housing sections are formed with a plurality of longitudinally spaced annular inclined interfitting cam planes formed on the inner surfaces 93 and 94 of the housing sections and the external walls 99 of the wedge sections so as to translate pull of the bar in an axial direction relative to the nut into radially gripping forces of the wedge sections 96 and 97 on the bar. The housing sections 91 and 92 are here secured together by a pair of threaded bolts 101 and 102 which extend through bores 103 in section 91 into threaded engagement with tapped bores 104 in housing section 92. It will be seen from the foregoing that the wedge nut can be readily mounted at any intermediate position on a bar member, thus enabling it for use with a fluid pressure means 49 of FIGURE 2, and the embodiments of FIGURES 3 and 4 as described hereinafter.

An important feature of the nut is that it can be easily removed from the bar after it has been used. Consequently, the wedge nuts in the embodiments of FIGURES 3 and 4 can be taken off of the tendons after they have been connected, thus enabling their use elsewhere.

With more detail now regarding the aforesaid jacking means, there are provided a pair of arms 41 and 42 mounted on a link member 43 for pivotal movement relative to one another and having free ends 44 and 46. The aforesaid jaws 23 and 24 are mounted respectively on the ends 44 and 46, and each have bearing surfaces 47 and 48 for engaging the corresponding couplers 17 and 26 in the apparatus of FIGURE 2. Fluid pressure means 49 is connected to draw the arms together whereby the couplers 17 and 26 can be moved into engagement with the connecting bar 16 as previously described. The fluid pressure means 49, as best seen in FIGURE 2, is of generally conventional construction and consists of a housing 50 providing an interior cylinder 51 within which is mounted for reciprocation a piston 52. One end 53 of the housing is attached by a bracket 54 to arm 41, while the piston 52 is connected to the other arm 42 by a rod 55 which here projects axially through the housing 50 and piston 52 so as to project from a piston shaft section 56 which extends through the opposite end 57 of the cylinder housing.

A wedge grip nut 58, as provided by the instant invention, forms a protuberance on the outer end 59 as the rod 55 so as to bear against the adjacent end of piston shaft section 56. The opposite end 60 of the rod 55 may be similarly connected to the arm 42 by a wedge grip nut 61 which is arranged to bear against a flange 62 provided on a mounting bracket 63 fixed to the arm 42.

Preferably, the mounting brackets 54 and 63 are of U-shape and are pivotally secured to arms 41 and 42 as illustrated. Housing 50 is here provided with inlet and outlet fittings 64 and 65 located adjacent the opposite ends 53 and 57 of the cylinder for conveying fluid under pressure into and out of the cylinder. As will be observed, the introduction of fluid under presure into inlet fitting 64 will cause a displacement of piston 52 to the left, as seen in FIGURE 2, thus effecting a closing of the arms 41 and 42 and jaws 23 and 24. Contrariwise, the admission of fluid into the cylinder by way of fitting 65 and the withdrawal of fluid by way of fitting 64 will permit a displacement of piston 52 to the right, as seen in the drawing, and an opening of the arms and jaws. It will be noted that the rod 55 is disposed intermediate the link 43 and the free ends of the arms 41 and 42, and is substantially parallel to the link 43. The rod 55 is seen to be movable relative to the arm 41.

In further describing the arms and jaws of the jacking means, it will be appreciated that the two arms are symmetrical and substantially identical to one another. Thus, reference is made now only to the arm 41 and jaw 23 mounted thereon. In particular, it is preferred that the free end 44 of the arm 41 includes a pair of bifurcated elements adapted to fit around the corresponding tendon 11. Similarly, the jaw 23 also includes a pair of bifurcated elements which fit around the tendon 11. In order to assure a firm grip of the couplers by the jaws, each jaw is pivotally mounted on its respective arm whereby the jaw and coupler need not move relative to one another as the arms are drawn together. Furthermore, in order to withstand the high forces involved in tensioning rods with the instant apparatus, the jaw 23 and free end 44 respectively have complementary arcuate bearing surfaces 66 and 67. In this manner, pivotal movement of the jaw relative to the arm is allowed but while still providing a sufficient bearing surface between these two members to transmit high force from the arms through the jaws to the couplers and rods. Preferably, the surface 66 is convex and is complementary to the concave surface 67. A pair of strap-like members 68 and 69, secured rigidly to the elements **44*a* and 44*b*, pivotally support the jaw 23 by means of stub shafts 70 and 71**, but because of the arcuate bearing surfaces these stub shafts need not support the full load transmitted to the tensioned rods.

As further regards the structure of the arms 41 and 42, it is preferred that these arms consist respectively of pairs of spaced arm members 72, 73 and 74, 76. Considering the arm 41, the spaced bifurcated elements **44*a* and 44*b* may be formed as integral extensions respectively of the members 72 and 73. The arm members are secured rigidly together by means of nuts 77, bolts 78, and spacers 79. The bar 55 extends through the spaces between the arm members, and similarly, the link 43** is pivotally secured between the arm members.

It will be seen that the arms 41 and 42 as shown mounted at spaced positions on the link 43 have their center lines in relatively parallel relationship. Movement of the arms towards one another thus requires a minimum of pivotal movement of the jaws 23 and 24 relative to their respective arms, thereby minimizing the friction involved in moving the arms together. Inasmuch as the tendons 11 and 12 to be joined are not always spaced the same distance aparat, it is desirable that the length of the link 43 be adjustable to provide the aforesaid generally parallel relationship of the arms. As here shown, link 43 is composed of a tubular center section 80 and a pair of removable end members 81 and 82 which are in turn pivotally connected to the adjacent ends of arms 41 and 42 by pivot bolts 83 and 84. Since the force on the link member during operation of the device is in compression, end members 81 and 82 are provided with flanges, as seen in FIGURE 2, for abutting the opposite ends of the tubular center section 80. Preferably, ring clamps 85 and 86 are mounted around the opposite ends of the tubular center section for squeezing down upon the inserted portions of end members 81 and 82 so as to hold the latter in place, the opposite ends of the tubular center section being slitted to permit compression by the ring clamps against the end members. Adjustment of the length of the link 43 may accordingly be conveniently effected by dismantling the center section 80 and end members 81 and 82 nnd replacing the center section with one of appropriate (longer or shorter) length.

An alternative embodiment of the invention is depicted in FIGURE 3, wherein the bar **16*a* is provided directly on the end of the tendon 11*a*. As shown, the bar 16*a* and tendon 11*a* are integrally formed as a single rod, although it will be appreciated that the bar 16*a* can also be secured to other types of tendons. The coupler 17*a*, as shown in FIGURE 3, is again secured to the tendon 12, and preferably comprises a double-ended coupler of the type described in S.N. 302,628. Separate jack engaging means 19*a* and 21*a* are here provided as protuberances on the tendons 11*a* and 12*a*, independent of the shoulders of the coupler 17*a*.**

As an important aspect of the invention, preferably, the protuberances are formed of the removable wedge grip nuts, described above. To connect the tendons **11*a* and 12*a*, the jacking means force the two tendons together and into engagement with the two ends of the coupler 17*a*,** whereupon the wedges of the coupler grippingly engage the tendons and hold them against return movement.

A third alternative embodiment of the invention is depicted in FIGURE 4, where again the coupler **17*b* is provided on the end of the tendon 12*b* and the bar 16*b* is provided on the end of the tendon 11*b*. Unlike the embodiment of FIGURE 3, however, the coupler 17 need not be of the double-ended type, although shown as such, and could for example be welded or otherwise secured to the tendon 12. The jack engaging means 21*b* here is provided by an end shoulder of the coupler 17*b*, while a removable wedge nut 19*b* of the instant invention is mounted on the bar 16 spaced from its end preferably serves as the other jack engaging means. In drawing the tendons toward one another, the bar 16*b* is moved axially into gripping engagement with the coupler 17*b*,** thus holding the tendons under tension.

In FIGURE 1, the present invention, as embodied in the above described methods and apparatus, is generally depicted in the operation of tension a plurality of rods 106 around a circular tank 107. A bracket 108 is provided on the arm 41 of the jacking means to enable the jack to be supported by a cable (not shown) from a suitable crane or the like disposed on top of the tank 107 and adapted to move along the tank's periphery. In mounting the rods 108 around the tank, a plurality of rods may be simply spliced together at adjacent ends by a coupler 28. This generally is best accomplished by first mounting the wedges separately on the rod ends, after which the housing is threaded on to the pairs of opposed wedges. These spliced rods are then disposed around the tank with the spaced opposed ends of two rods remaining to be joined. As shown, a pair of couplers 17 and 26 and a connecting bar 16 are used to join the remaining ends in the manner described hereinabove with regard to the embodiment of FIGURE 2, thus placing each of the encircling rod assemblies under tension. A high pressure fluid compressor 109 is connected to the fluid pressure fittings 64 and 65 of the hydraulic actuator 49 by a pair of conduits 111 and 112. The compressor 109 is preferably portable for movement around the tank together with the jacking means. The compressor illustrated is one manufactured by Lincoln Engineering Company of St. Louis, Mo., and ordinarily sold as a high pressure lubricant pump. This unit is air-motor operated and may be produced to provide a 70 to 1 ratio so that 100 pounds per square inch air pressure will yield 7,000 pounds per square inch oil pressure for application to the hydraulic actuator 39. Of course, any suitable commercially available high pressure hydraulic source may be used.

It will be appreciated that with a relatively large tank, the joining together of the couplers 17 and 26 may not provide the desired tension in the tendons around the whole tank, since nonuniformity of tension is likely to be caused by friction. Consequently, it may be desirable to draw each pair of opposed tendon ends together to tension them, rather than simply splice them as shown, in addition to applying tension to the last pair of ends to be connected. To do this, considering the embodiment of FIGURE 3, for example, the wedge members of the coupler would be separately mounted on the tension ends, apart from the coupler housing, but just far enough to hold them on during initial tensioning. Then a coupler housing is threaded onto the wedges in the manner described in S.N. 302,628 to form the splice. By mounting the split wedge nuts of the invention on each tendon end, as shown in FIGURE 3, it is then possible to bring the jack to each splice joint and draw the tendons all the way into the wedges, thus taking up slack at each splice position. After all the splices are tightened in this manner, further removal of slack can be accomplished with regard to the second application of force at each splice connection, and rotation of the coupler to draw up the tendon ends as tightly as possible. Each of the splice connections, of course, can similarly be made in accord with the embodiments of the invention depicted in FIGURES 2 and 4.

From the foregoing it is apparent that the present invention, viz, the one-way removable gripping nut affords a highly convenient device for connecting and placing tendons under tension, and which can be utilized to utmost advantage in providing extremely high tensile forces that approach the maximum tensile strength of the tensioned members.

I claim:

1. A one-way gripping nut for mounting on a bar at a position intermediate the ends thereof comprising, a pair of substantially half-cylindrical housing members adapted for positioning around a bar in generally opposed relationship and having their inner surfaces spaced radially from the periphery of said bar, two separate wedge segments each adapted for interposition respectively between one of said housing members and said bar, said wedges having inner bar engaging surfaces formed with teeth adapted for biting into and compressively engaging and gripping the periphery of said bar, and a plurality of longitudinally spaced annular inclined and interfitting cam planes formed on said inner surfaces of said housing members and the external walls of said wedges, said planes diverging away from the direction of pull out of said bar from said housing members so as to translate pull of said bar in an axial direction relative to said housing members into radially internal gripping forces of said wedges on said bar periphery, said housing members each being formed with a reduced portion terminating in a jack engaging shoulder at its free end and a radial shoulder on its outer periphery and at its other end, said jack engaging shoulder facing away from the direction of axial loading of the bar, said reduced portions protruding a sufficient distance beyond said interfitting cam planes and forming an annular recess between said bar and housings of a depth to allow said wedges to advance to a position for maximum radial gripping without engaging the jacking means, and means for securing said housing members together on said bar and urging them towards one another.

References Cited

UNITED STATES PATENTS

| | | | |
|---|---|---|---|
| 1,854,140 | 4/1932 | Hopkins | 24—136 |
| 2,143,005 | 1/1939 | Green | 287—52 XR |
| 2,930,642 | 3/1960 | Howlett | 287—114 |
| 3,146,549 | 9/1964 | James | 52—224 |

DAVID J. WILLIAMOWSKY, Primary Examiner

ANDREW V. KUNDRAT, Assistant Examiner

U.S. Cl. X.R.

24—136